United States Patent [19]

Bauer

[11] Patent Number: 5,100,063

[45] Date of Patent: Mar. 31, 1992

[54] RECOVERY OF COMPONENTS OF WASTE PLASTERBOARD

[75] Inventor: Fred M. Bauer, Salem, Oreg.

[73] Assignee: West Fab, Inc., Salem, Oreg.

[21] Appl. No.: 541,273

[22] Filed: Jun. 19, 1990

[51] Int. Cl.⁵ .................................. B02C 19/12
[52] U.S. Cl. ........................... 241/14; 241/24; 241/DIG. 38
[58] Field of Search .......... 241/14, 24, 29, 79, 241/293, 223, 231, 235, 159, 78, 234, DIG. 38

[56] References Cited

U.S. PATENT DOCUMENTS

| 1,774,318 | 8/1930 | Coomes | 241/78 |
| 2,962,230 | 11/1960 | Dilley et al. | 241/14 X |
| 3,684,196 | 8/1972 | Hankins | 241/14 |

FOREIGN PATENT DOCUMENTS

| 2413130 | 8/1979 | France | 241/14 |
| 1172700 | 8/1986 | Japan | 241/DIG. 38 |

Primary Examiner—Mark Rosenbaum
Attorney, Agent, or Firm—Chernoff, Vilhauer, McClung & Stenzel

[57] ABSTRACT

A method and apparatus for processing waste plasterboard consisting of sheets of paper or similar material adhered to a core of plaster of paris or the like, for recovering and separating the cover material from the gypsum of the core and for collecting each in a conveniently reusable form. A pair of rollers have parallel axes of rotation and are held to a variably close spacing under pressure while being counterrotated to grasp and crush pieces of plasterboard, delivering the paper and crushed gypsum core material to a vibrating screen which separates the two for separate collection and subsequent reuse as raw materials or for other purposes. A second crusher and screen may be used for additional separation of the materials.

4 Claims, 3 Drawing Sheets

RECOVERY OF COMPONENTS OF WASTE PLASTERBOARD

BACKGROUND OF THE INVENTION

The present invention relates to recovery of reusable component materials from waste construction materials, and particularly relates to a method and apparatus for economical recovery of paper and gypsum from waste plasterboard.

Plasterboard is commonly used for covering the framework of interior walls of buildings and commonly includes a cover sheet of paper or other tough fibrous material adhered to at least one major side of a planar core of a hardened cast mineral material such as, typically, plaster of paris, a cast gypsum material. As used herein, the term "plasterboard" is to be taken generally to include various types panel of material of this general type of construction, and the term "gypsum" will be used to refer generally to the cast core of mineral material of such plasterboard.

Quantities of waste plasterboard are usually left over after construction of new buildings or remodeling of old buildings. Such waste plasterboard is a nuisance to construction contractors who are eager to dispose of the material without having to pay for having it hauled to landfill sites. In the form of odd-sized pieces the plasterboard is bulky, and it takes up considerable amounts of space if discarded into landfill. The material is not easily disposed of, since it is relatively heavy and not particularly easy to handle. However, plasterboard contains both paper or similar material and gypsum, both of which can be reused if separated from each other. However, the gypsum normally adheres tightly to the paper, making it difficult to separate the paper from the gypsum core material. Previously, hammer mills and other grinding or shredding equipment have been used to break the plasterboard into small pieces and free the gypsum from the paper thereof. This, however, produces pieces of paper too small to be baled conveniently to be transported for recycling of the paper fiber. The smallest pieces of paper thus produced are also impractical to remove from the resultant gypsum and make the gypsum undesirable for certain uses. For example, powdered gypsum is very useful as a soil treatment, particularly in culture of mushrooms, but the inclusion of paper bits with the gypsum makes the gypsum undesirable for such use. Additionally, the use of a hammer mill produces undesirably large quantities of dust.

What is needed, then, is a method and apparatus for separating the paper or similar sheet material used as cover layers from the gypsum core of plasterboard, so that both the paper and gypsum materials can be reused, instead of the plasterboard having to be discarded as landfill material.

SUMMARY OF THE INVENTION

The aforementioned shortcomings and disadvantages of the prior methods and apparatus for disposal of waste plasterboard are overcome by the present invention, which provides a method for processing waste plasterboard to separate the gypsum core material from the paper and other fibrous sheet cover materials, so that both the fibrous sheet materials and the gypsum can be recovered substantially separate from each other to be recycled economically.

In accordance with the method of the present application individual pieces of plasterboard are passed between a pair of counterrotating press rolls which crush the gypsum core of the plasterboard. This produces gypsum powder and small pieces of gypsum which fall free from the paper cover sheets, while the paper cover sheets remain in the form of large enough pieces of paper to be conveniently handled and can be baled for transportation for future recycling.

The crusher apparatus of the present invention includes a pair of strong rolls, preferably generally cylindrical and of equal size and driven counterrotatingly with equal surface speeds, with the rolls being pressed together with sufficient force to crush pieces of plasterboard fed between them, so as to release the fractured gypsum from adherence to the cover sheets of the plasterboard.

In a preferred embodiment of the invention, the axes of the rolls are parallel and define a plane located at an acute angle to the vertical, and a conveyor provides pieces of plasterboard to an infeed slide which guides the pieces of plasterboard to a position between the counterrotating rolls where their edges are grasped and the pieces are drawn between the counterrotating rolls to be crushed. A vibrating screening mechanism separates the crushed gypsum from the large pieces of paper coming from the crusher. Additional conveyors carry the paper and the crushed gypsum separately to bins or the like for collection.

In a preferred embodiment of the invention there may be a second similar crusher following a screen or other size sorting apparatus to receive and recrush all of the pieces of plasterboard material which are larger than a particular size.

It is a principal object of the present invention, therefore, to provide an improved method and apparatus for recovering cover sheet material and gypsum core material from plasterboard.

It is another important object of the present invention to provide a method and apparatus for recovering gypsum from plasterboard in a form which is substantially free from pieces of paper or other cover sheet materials.

An important feature of the apparatus of the present invention is that it includes a pair of counterrotating, generally smooth rolls urged movably toward one another and used to crush pieces of plasterboard and thus release the gypsum from the cover sheets of the plasterboard, reducing the gypsum to small pieces, while leaving the cover sheets of paper or the like in large enough pieces for convenient handling.

Another feature of one embodiment of the invention is the combination of press rolls and screening apparatus to separate crushed core material from the paper or similar cover sheet material of plasterboard being treated in accordance with the invention.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
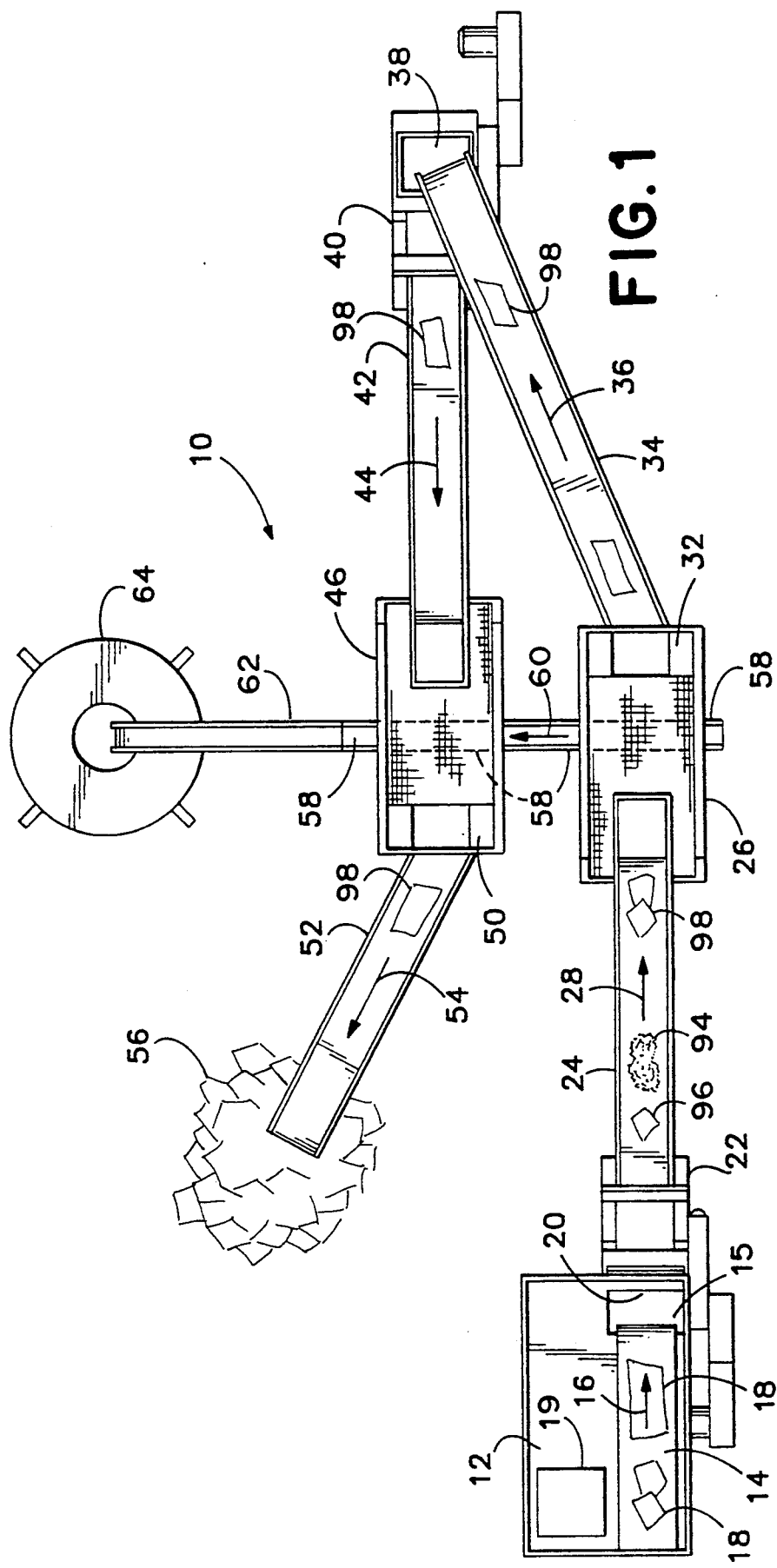
FIG. 1 is a simplified plan view of exemplary apparatus usable for recovering gypsum and paper or the like from plasterboard, in accordance with the present invention.
Figure 2:
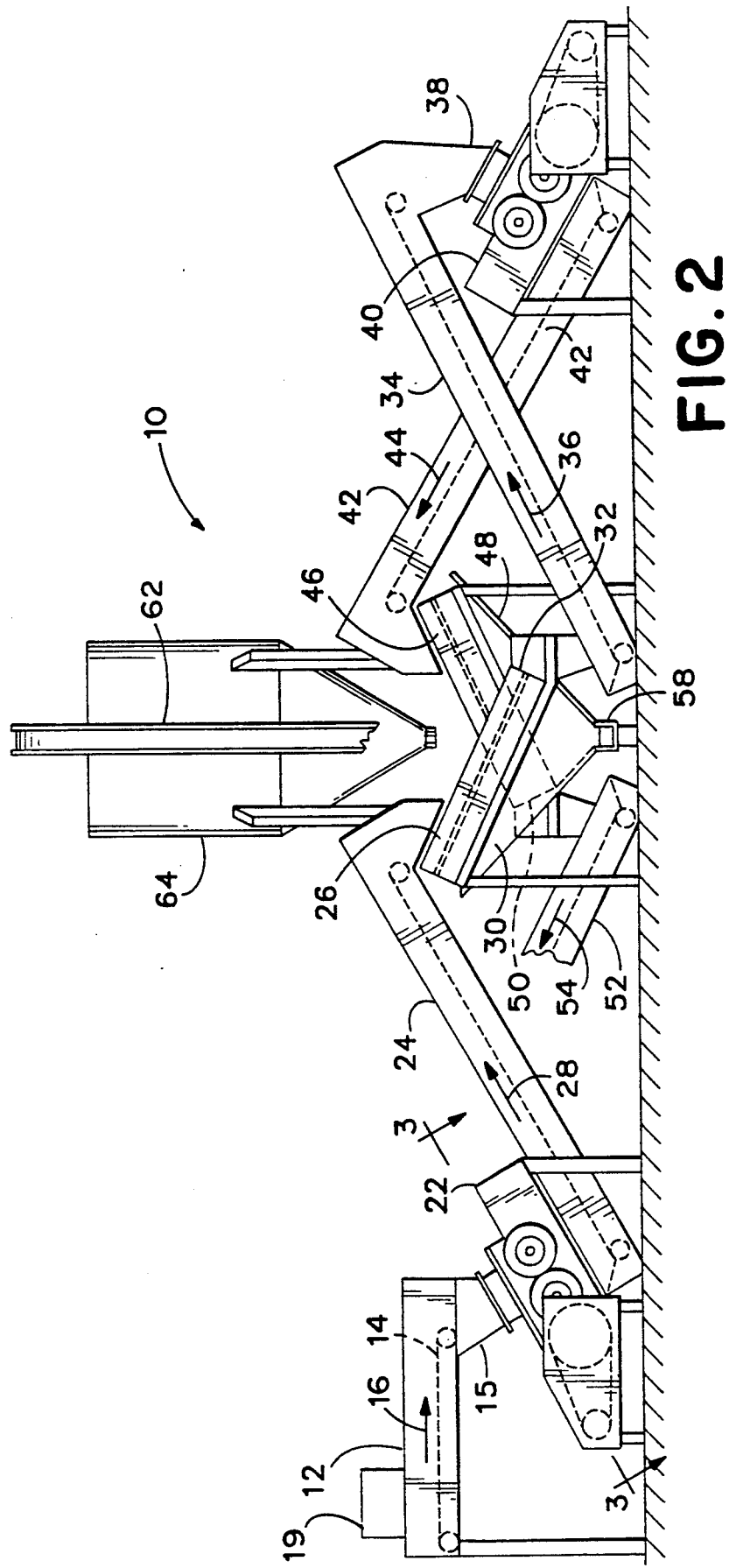
FIG. 2 is a simplified side elevational view of the apparatus shown in FIG. 1.

Referring now to the drawings which form a part of the disclosure, plasterboard recycling apparatus 10 embodying the present invention is shown generally in FIGS. 1 and 2.

An infeed tray 12 slopes downwardly toward an infeed conveyor 14, preferably an endless belt conveyor, moving in the direction indicated by the arrow 16 and large enough to accommodate pieces of plasterboard 18, which have been cut to a small enough size by a suitable shear apparatus 19 not shown in any detail herein. The conveyor 14 carries the pieces of plasterboard 18 to an infeed port 20 on the upper side of a first crusher 22. A suitable crusher is available from the Iowa Manufacturing Company of Cedar Rapids, Iowa as its Model 30 × 18 Standard Twin-Roll Crusher which will be described in greater detail presently.

A conveyor 24 extends beneath the first crusher 22 to receive material which has passed through the crusher 22, and is upwardly inclined towards a first sifting apparatus 26. The conveyor 24 may also be of an endless belt design, and operates to carry materials in the direction indicated by the arrow 28 to the upper end of a first sifting apparatus 26, preferably a vibrating screen apparatus such as a 36-inch-wide short stroke, high amplitude vibrating screen made by Derrick Mfg. Corporation of Buffalo, New York. Preferably, the vibrating screen sifting apparatus 26 slopes downwardly away from the discharge end of the conveyor 24, as shown in FIG. 2.

Beneath the vibrating screen sifting apparatus 26 is a suitable hopper 30 which collects material which is small enough to pass through the vibrating screen sifting apparatus 26. For example, the vibrating screen 26 may define openings of mesh size 64 to pass material of that size or smaller, while retaining all larger pieces of material on its upper surface to be carried downward along the incline of the sifting apparatus 26 to be discharged at its lower end 32 into the lower end of a conveyor 34. Depending on the requirements of the future use of the gypsum, a mesh size 100, or a larger size mesh may be preferable.

The conveyor 34 may also be an endless belt conveyor and carries material in the direction indicated by the arrow 36 to be discharged into the infeed port 38 of a second crusher 40 which is generally similar to the first crusher 32, although it may be of a different size.

Most of the gypsum core material is broken free from the paper cover sheets of the plasterboard 18 in the first crusher 22, but may not be broken into small enough pieces to pass through the screen of the first sifting apparatus 26, and is therefore carried to the second crusher 40 after passing off the lower end 32 of the first sifting apparatus 26 together with the pieces of paper or other cover material of the plasterboard 18. After passing downward through the second crusher 40, material falls into a conveyor 42 which is upwardly inclined. The conveyor 42 may also be an endless belt conveyor, and is operated to carry material upward in the direction indicated by the arrow 44, to be discharged onto the upper end of a second vibrating screen sifting apparatus 46, similar to the sifting apparatus 26, which is also downwardly inclined, as may be seen in FIG. 2.

The material passing over the second vibrating screen sifting apparatus 46 again is separated, with the gypsum material passing through the openings defined in the vibrating screen of the sifting apparatus 46 into a hopper 48 located beneath the second vibrating screen, as shown in FIG. 2. The material which is in pieces too large to pass through the screen of the sifting apparatus 46 remains on the top of the screen and slides off the lower end 50 of the second vibrating screen sifting apparatus 46 onto a paper conveyor 52, which may be an endless belt conveyor and which carries the paper in the direction of an arrow 54 to a paper stack, as shown in FIG. 1. Alternatively, the conveyor 52 may carry the paper to a collecting bin or baler (not shown) which do not form a part of the present invention.

The gypsum material which has passed through the screen of either of the sifting apparatus 26 or 46 into the respective hopper 30 or 48 exits the respective hopper onto a horizontal conveyor 58 which carries the gypsum, primarily in the form of powder, in the direction of the arrow 60.

An upwardly inclined conveyor 62, which may also be an endless belt conveyor of appropriate length and arranged at an appropriate inclination, carries the gypsum material from the outfeed of the horizontal conveyor 58 upward, to deposit it in the top of a storage silo 64, from which the gypsum can be released for gravity flow into a suitable container for transport.

Figure 3:
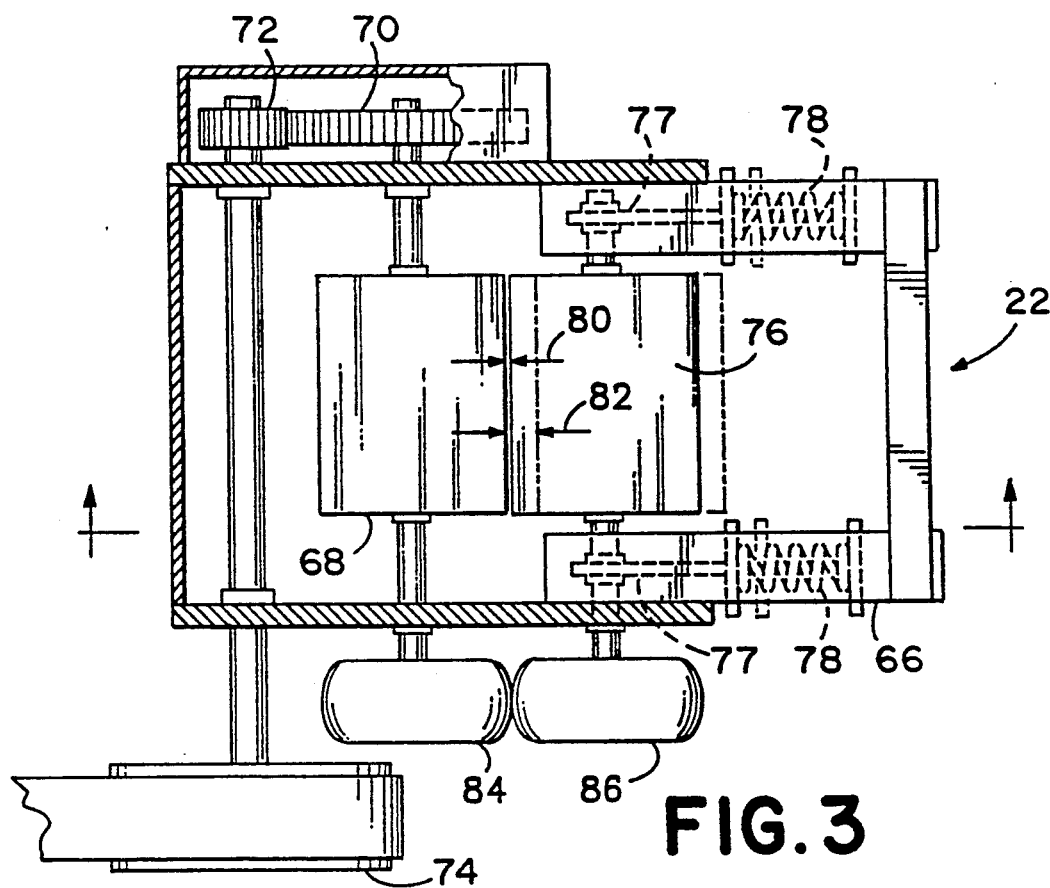
FIG. 3 is a view of a crusher including a pair of press rolls, which is a part of the apparatus shown in FIGS. 1 and 2, taken at an enlarged scale in the direction indicated by line 3—3 in FIG. 2.
Figure 4:
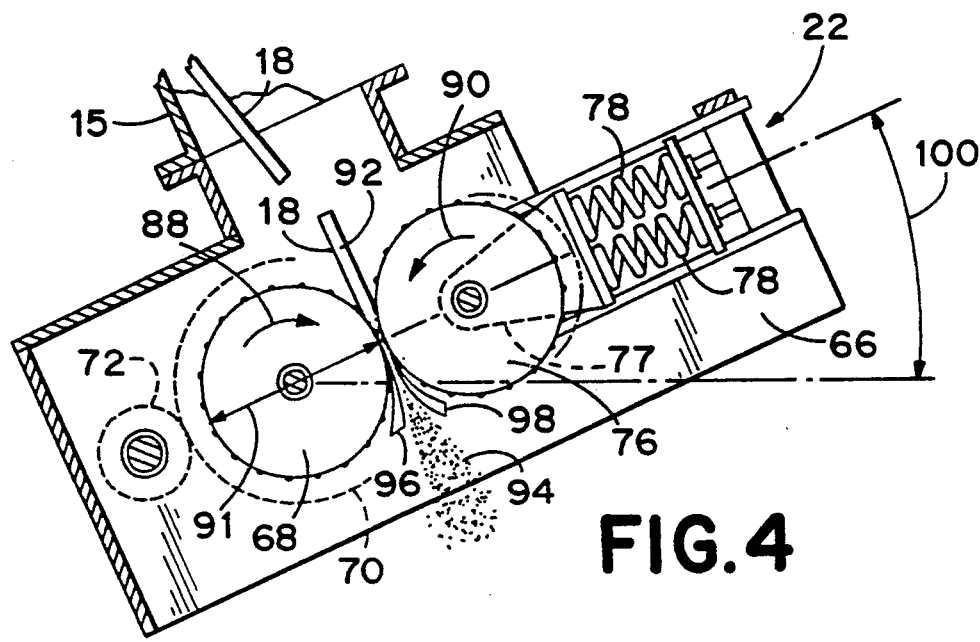
FIG. 4 is an simplified sectional view of the crusher shown in FIG. 3, taken along line 4—4.

Referring now also to FIGS. 3 and 4, the crushers 22 and 40 may both be of similar construction, and therefore only the first crusher 22 will be described in detail. Such a crusher has a suitably strong frame 66 supporting a pair of cylindrical crusher rolls. A first crusher roll 68 is mounted rotatably on the frame 66 in a fixed location and includes a shaft carrying a bull gear 70, driven by a pinion 72 mounted on a shaft carrying a belt drive pulley 74.

A second press roll 76 is mounted on a rotatable shaft carried by a pair of bearings 77 which are movable with respect to the frame 66, but are urged along the frame 66 toward the first press roll 68, as, for example, by heavy wire coil springs 78. Shims (not shown) may be utilized to establish a minimum spacing 80 between the first and second press rolls 68 and 76, but when the amount of material between the press rolls 68 and 76 becomes too great or if a piece of metal is accidentally fed into the crusher the coil springs 78 permit the second press roll 76 to move further from the first press roll 68, as shown by the spacing 82.

Preferably, a pair of inflated pneumatic tires 84, 86 are fixedly mounted on the respective shafts of the first press roll 68 and second press roll 76 and press against each other, so that the second press roll 76 is driven by rotation of the first press roll 68, in a counterrotating direction, despite the movement of the second press roll along the frame 66 between the minimum spacing 80 and a greater spacing 82 during operation of the crushers 22 or 40.

As may be seen best in FIG. 4, the press rolls 68 and 76 rotate in opposite directions as indicated by the arrows 88, 90. Preferably, the press rolls 68, 76 are similar, having a right circular cylindrical shape with a beaded peripheral surface, that is, having longitudinal parallel beads of weld material applied at intervals of about one inch to enhance the ability of the roll surfaces to grip material being fed between the rolls 68, 76. The rolls 68, 76 have equal diameters 91 of about 30 inches in the first crusher 22, and may have smaller equal diameters 91, such as 24 inches, in the second crusher 40. The rolls are rotated to provide a surface linear speed of about 500 ft/min, for example, and the second press roll 76 is permitted to move to be within a minimum spacing 80 of about 3/8 inch from the first press roll 68, in the first crusher 22, and ⅛ inch in the second crusher 40, so that when a piece 18 of plasterboard slides down the inclined chute 15 from the end of the infeed conveyor 14, the piece 18 will be engaged between the first and second press rolls 68, 76, to be drawn downward as a result of the rotation of the press rolls. As the plasterboard 18 is drawn between the press rolls the gypsum of the core 92 is fractured into small pieces and dust 94 which fall downward beneath the press rolls 68, 76 onto the conveyor 24. At the same time, the paper cover layers 96, 98, remain largely intact until the entire piece 18 of plasterboard has passed through the space between the press rolls 68, 76, when the cover layers 96, 98 are also deposited onto the conveyor 24.

In order for the pieces 18 of plasterboard to enter more easily edge-first between the press rolls 68 and 76, the crushers 22 and 40 are preferably arranged so that the central axes of the rolls define a plane inclined to the horizontal by an angle 100 (see FIG. 4) in the range of 20° to 40° and preferably of about 30°. This inclination also permits use of simple straightline conveyors 24 and 42 located close beneath the crushers 22, 40.

While most of the gypsum core material 92 will be shattered into powder and thus become separated from the cover layers 96, 98, pieces of gypsum which adhere to the paper layers 96, 98 or are not shattered into small enough pieces to pass through the first vibrating screen sifting apparatus 26 are then conveyed to the second crusher 40. There, further crushing of the gypsum core material 92 occurs, with the closer minimum spacing 80, separating substantially all of the remaining attached pieces of gypsum from each of the cover layers 96, 98, so that the paper or similar material of the cover layers 96, 98 will be delivered by the conveyor 52 to the paper stack or other storage substantially without any adhering core material, while the gypsum, in the form of powder or small pieces, is conveyed from the hoppers 30 and 48 into the storage silo 64.

As result of the use of beaded surface cylindrical press rolls 68, 76 in each of the crushers 22, 40, the paper cover layers 96, 98 remain largely intact, rather than being broken into minute pieces as occurs when a hammer mill is used to separate the paper and comminute the plaster of paris core material 92. The paper of the cover layers 96, 98, is thus left in large enough pieces by the apparatus of the present invention to be handled conveniently, as by being baled for transport to a paper manufacturing facility. At the same time the gypsum material is substantially pure and largely in the form of very small particles and powder, so that it is immediately ready for use as a soil conditioner, particularly in culture of mushrooms, for example.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A method for recovering reusable material from waste plasterboard of the type having at least one sheet of fibrous material and a layer of gypsum comprising:
   (a) feeding a piece of plasterboard between counterrotating rolls on an infeed side;
   (b) urging said rolls towards one another with a predetermined amount of pressure while feeding said piece of plasterboard therebetween;
   (c) fracturing and releasing at least a majority of said gypsum from adherence to said sheet of fibrous material by action of said rolls on said piece of plasterboard; and
   (d) thereafter sifting said plasterboard to separate said gypsum from said fibrous material.

2. A method for recovering reusable material from waste plasterboard of the type having at least one sheet of fibrous material and a layer of gypsum, comprising:
   (a) providing a pair of closely spaced, opposed counterrotating rolls having parallel axes of rotation and defining an infeed side;
   (b) feeding a piece of plasterboard between said counterrotating rolls on said infeed side;
   (c) urging said rolls toward one another with a predetermined amount of pressure while feeding said piece of plasterboard therebetween;
   (d) fracturing and releasing at least a majority of said gypsum from adherence to said sheet of fibrous material by action of said rolls on said piece of plasterboard; and
   (e) thereafter sifting said plasterboard to separate said gypsum from said fibrous material.

3. The method of claim 2, including the further step of conveying pieces of plasterboard toward said infeed side on a conveyor and feeding said pieces of plasterboard between said counterrotating rolls as a single layer of said pieces.

4. The method of claim 2, including the further step of mounting at least one of said pair of rollers movably with respect to the other and urging said pair of rollers toward one another so as to grip said plasterboard and urge both said fiber material and said gypsum between the ones of said pair of rolls.

* * * * *

UNITED STATES PATENT AND TRADEMARK OFFICE
CERTIFICATE OF CORRECTION

PATENT NO. : 5,100,063

DATED : March 31, 1992

INVENTOR(S) : Fred M. Bauer

It is certified that error appears in the above-identified patent and that said Letters Patent is hereby corrected as shown below:

Col. 5, line 9  Change "1/2" to --1/4--.

Signed and Sealed this

Third Day of August, 1993

Attest:

MICHAEL K. KIRK

Attesting Officer

Acting Commissioner of Patents and Trademarks